(12) United States Patent
Tsai

(10) Patent No.: US 8,165,132 B2
(45) Date of Patent: Apr. 24, 2012

(54) SCHEDULING APPARATUS, MOBILE STATION THEREWITH, AND METHOD THEREFOR

(75) Inventor: Ting-Ming Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 541 days.

(21) Appl. No.: 12/399,986

(22) Filed: Mar. 9, 2009

(65) Prior Publication Data

US 2010/0157915 A1  Jun. 24, 2010

(30) Foreign Application Priority Data

Dec. 23, 2008  (TW) ................................ 97150325 A

(51) Int. Cl.
*H04L 12/28* (2006.01)
*H04W 4/00* (2009.01)
(52) U.S. Cl. .................... 370/395.42; 370/412; 370/328
(58) Field of Classification Search ............ 370/395.21, 370/395.1, 395.2, 395.4, 395.42, 395.41, 370/412, 413, 396, 468, 328, 329
See application file for complete search history.

(56) References Cited

U.S. PATENT DOCUMENTS

| 6,865,388 | B2 * | 3/2005 | Walsh et al. ................... 455/428 |
| 7,873,050 | B2 * | 1/2011 | Kim et al. ...................... 370/392 |
| 7,944,824 | B2 * | 5/2011 | Lee et al. ....................... 370/230 |
| 2005/0063392 | A1 | 3/2005 | Ofuji et al. |
| 2007/0047553 | A1 | 3/2007 | Matusz et al. |
| 2007/0206545 | A1 | 9/2007 | Lee et al. |

* cited by examiner

*Primary Examiner* — Hanh Nguyen

(74) *Attorney, Agent, or Firm* — Jianq Chyun IP Office

(57) ABSTRACT

A method for real-time uplink traffic scheduling in a mobile station (MS) to communicate with a base station (BS) in a wireless mobile system. When the BS provides a bandwidth grant to the MS in reply to the uplink from the MS, the uplink service flow will be assigned to different connections with corresponding priorities according to contents of the service flow. The packets within the service flows will be scheduled according to, at least, the bandwidth grant byte size, priorities of the connections, decoding times for transmitting the packets, and/or real-time factors. Within the limitation of the bandwidth grant provided by the BS, types and an order of the packets for transmitting are scheduled accordingly, and the packets received by the BS can satisfy the requirements of the real-time factors for the BS or the decoders, and greatest amount of effective data can be decoded.

24 Claims, 19 Drawing Sheets

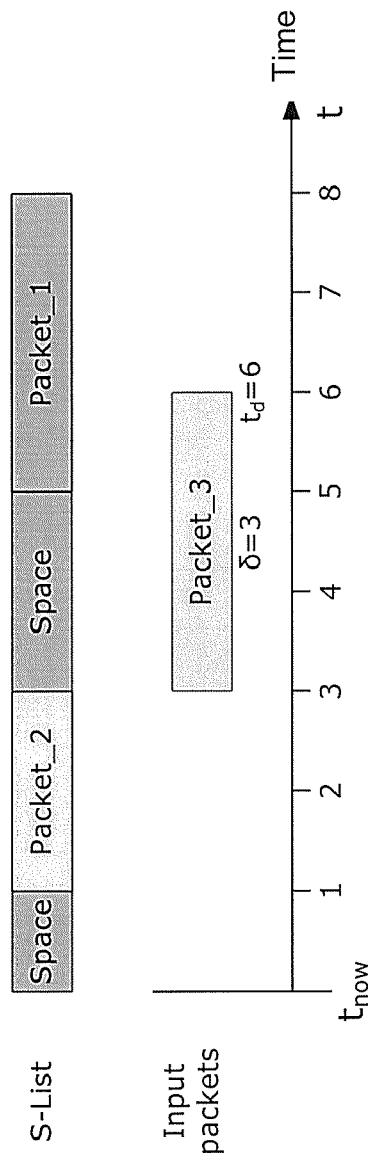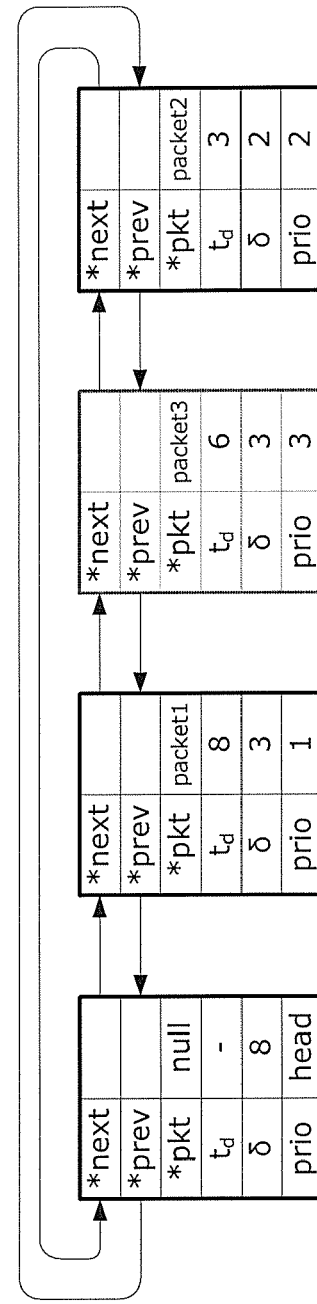
FIG. 6G
FIG. 6H

|  | Priority First + RR | | Decoded-time First | | Priority Enhanced | |
|---|---|---|---|---|---|---|
|  | MP4 | VoIP | MP4 | VoIP | MP4 | VoIP |
| VoIP (2000) |  | 2000 |  | 2000 |  | 2000 |
| I (84) | 75 |  | 80 |  | 84 |  |
| P (250) | 222 |  | 239 |  | 249 |  |
| B (665) | 571 |  | 609 |  | 645 |  |
| Q | 0.868 | 1 | 0.928 | 1 | 0.978 | 1 |

BS grant bw=84KByte/sec.  I, P, and B in frame.  Q in ratio

FIG. 7B

|         | Priority First + RR | | Decoded-time First | | Priority Enhanced | |
|---------|----------|----------|----------|----------|----------|----------|
|         | A stream | B Stream | A stream | B Stream | A stream | B Stream |
| I (84)  | 55       | 54       | 69       | 64       | 84       | 84       |
| P(250)  | 140      | 145      | 202      | 184      | 249      | 248      |
| B(665)  | 356      | 362      | 499      | 464      | 586      | 568      |
| Q       | 0.551    | 0.561    | 0.770    | 0.712    | 0.919    | 0.900    |

BS grant bw=84KByte/sec. I, P, and B in frame. Q in ratio

FIG. 8B

SCHEDULING APPARATUS, MOBILE STATION THEREWITH, AND METHOD THEREFOR

CROSS-REFERENCE TO RELATED APPLICATION

This application claims the priority benefit of Taiwan application serial no. 97150325, filed Dec. 23, 2008. The entirety of the above-mentioned patent application is hereby incorporated by reference herein and made a part of specification.

BACKGROUND OF THE INVENTION

1. Field of the Invention

The present invention relates to a method for real-time traffic scheduling, and more particularly to a real-time uplink traffic scheduling apparatus in a mobile station and a method therefor.

2. Description of Related Art

In the IEEE 802.16e standard, four sublayers have been respectively identified as a convergence sublayer (CS), a medium access control (MAC) common part sublayer, a security sublayer, and a physical layer. Among the sublayers, the security sublayer is responsible for the authorization, key management, and encryption/decryption calculation of data at the user end.

In the IEEE 802.16e standard, a base station (BS) provides a bandwidth grant to an uplink bandwidth of each mobile station (MS) instead of respectively appointing a bandwidth value to each of the service flows in the MS. Thus, a scheduler of the BS must assign appropriate and sufficient bandwidths to all the MS, and achieve the largest throughput of the system.

On the contrary, the MS can only accept the bandwidth size assigned by the BS. An important functional index for the MS scheduler of the MS is how the bandwidth provided by the BS is used efficiently, regardless of the bandwidth being sufficiently provided by the BS to the MS. Therefore, the MS must by itself assign the order and the sizes of packets for transmitting in an uplink service flow to achieve the greatest efficiency of the bandwidth grant and transmit the greatest amount of the effective data.

If the bandwidth granted by the BS decreases, such that the MS can not transmit all the packets before their corresponding decoding times, the packets that are relatively more important should be satisfied first. Audio and video containing data, in a MP4 format which is established by the Moving Picture Experts Group (MPEG) of the International Organization for Standardization (ISO), is used as an example. The data in this standard includes the I-frame, the P-frame, and the B-frame. The I-frame is an intra coded picture, which is a reference diagram that is equivalent to a fixed image and is independent of other diagram types. Every diagram group starts with pictures of this type. The P-frame is a predictive coded picture, which includes the difference information from the previous I-frames or P-frames, and predicts with the reference to the previous I-frames or P-frames. The B-frame is a bidirectionally predictive coded picture, which includes the difference information from the previous and/or the following I-frames or P-frames, and the estimation applies a forward estimation, a backward estimation, or a bidirectional estimation with the previous or the following I-frames or P-frames as the main reference.

Therefore, take transmitting the MP4 formatted data as an example; the most important I-frame data should have be given higher priority while priorities of the P-frames and the B-frames should be reduced sequentially. Since the loss of the B-frames is firstly considered, higher percentages of the I-frames and the P-frames can be received successfully and thereby improving the phenomenon of decoding frame reduction due to the decrease in bandwidth.

In the U.S. patent publication No. 2007/0047553 A1, a method of uplink scheduling in wireless networks is disclosed. In the publication, the MS classifies the service flows of the uplink scheduling service into two categories. The first category is an unsolicited grant service (UGS) that does not require a bandwidth request, and the second category is a non-unsolicited grant service (non-UGS). The priority of the UGS category is higher than that of the non-UGS category. After the MS receives the bandwidth assigned by the BS, the packets in the UGS flow are first scheduled based on the priorities of the UGS flow. The method of transmitting the packets follows the principle of IEEE802.16e, such that the last packet may be fragmented if the packet can not be sent completely.

When all packets in the UGS have been sent, the remaining bandwidth is first reserved for signals having bandwidth requests (BW-request). Afterward, the packets in the non-UGS flow will be sent. The method of packet transmitting also follows the principle of IEEE802.16e, such that the last packet may be fragmented if the packet can not be sent completely. When all of the packets have been sent, then the bandwidths occupied by the BW-request signals will be returned and the next service flow will be scheduled. If two or more UGSs are present, then the order of transmitting will be arranged using a round-robin method. If two or more non-UGSs are present, then the order of transmitting will be arranged using a weighted round-robin method.

In the U.S. patent publication No. 2007/0206545 A1, an uplink scheduling method called "prioritization of connection identifiers for an uplink scheduler in a broadband wireless access communication system" is disclosed.

In the publication, the scheduler of the MS interprets the bandwidth size assigned by the BS to be that when the value of the BW-grant is greater than the value of the BW-request, the UGS portion of the BW-grant bandwidth must be scheduled into the UGS packets first. When the value of the BW-grant is smaller than the value of the BW-request, the bandwidth of the BW-grant does not include the UGS portion, and only the non-UGS portion will be scheduled. If the UGS packets are scheduled first, most of the non-UGS packets will not be sent, such that the MS will request more bandwidths from the BS, which results in inaccuracy when the BS assigns bandwidths to other MSs.

In the U.S. patent publication No. 2005/0063392 A1, a packet control apparatus and a method thereof called "packet-priority control apparatus and method thereof" is disclosed. The scheduling method of this prior art, as shown in FIG. 1, uses the method of adjusting priorities of the packets, which arranges each of the packets and increases the packet priorities at a predetermined fixed time $T_{pri}$ before their respective decoding times, so that the expiring packets can be sent with first priority.

$$\text{priority} = \text{priority} + \begin{cases} 0, & t < T_{req} - T_{pri} \\ \alpha, & t \geq T_{req} - T_{pri} \end{cases}$$

Here, $\alpha$: pre-determined constant.

In the aforementioned patent publications or other related patent publications, such as the U.S. patent publication NO.

2007/0206545 A1, priorities are given only based on the service types of the service flows instead of giving packets different priorities without considering the difference between the packet types in the various service flows. Moreover, the various demands of the decoding times for each packet are not weighted in the real-time flow.

Also, in the U.S. patent publication NO. 2007/0206545 A1, the non-UGS packets still use the priority-based scheduling method. If the packets are sent to the BS only for their higher priorities, the order of packet for transmitting will be affected by whether the bandwidth grant provided by the BS is greater or smaller than the size of the BW-request.

Furthermore, in the U.S. patent publication NO. 2005/0063392 A1, if the predetermined $\alpha$ is too large, then the packets originally having low priorities may have higher priorities than the packets originally having high priorities after the addition of $\alpha$, such that the original packets with high priorities cannot be scheduled. However, if the $\alpha$ is too small, then the scheduling results will be the same as using the original priority-based scheduling method. In addition, if the selected $T_{pri}$ is a fixed time, then the time of priority adjustment will be affected by different $T_{pri}$ values.

SUMMARY OF THE INVENTION

The present invention provides a method of real-time uplink traffic scheduling in a mobile station (MS) to communicate with a base station (BS) in a wireless mobile system. When the BS provides a bandwidth grant to the MS in reply to the uplink from the MS, the uplink service flow will be assigned to different connections with corresponding priorities according to contents of the service flow. The packets within the service flows will be scheduled according to, at least, the bandwidth grant byte size, priorities of the connections, decoding times for transmitting the packets, and/or real-time factors. Within the limitation of the total bandwidth grant provided by the BS, types and an order of the packets for transmitting are scheduled accordingly, so the packets received by the BS or decoders can satisfy the requirements of the real-time factors, and a greater amount of effective data can be decoded.

In one embodiment, the present invention provides a mobile station, which includes a first storage queue set, a classifier, a second storage queue set, a scheduler, and a protocol data unit (PDU) constructor. The first storage queue set has a plurality of storage queues used to receive a plurality of packets of various transmission types. The classifier is connected to the storage queue set to receive the packets. The second storage queue set has a plurality of storage queues and is connected to the classifier, which then base on a characteristic value of the packets to classify and store the packets of the second storage queue set to the storage queues of the second storage queue set. The scheduler is connected to the second storage queue set. Moreover, the scheduler schedules the packets stored in the second storage queue set according to an order of the storage queues with a s-list, and generates a tx-list and a drop-list based on a bandwidth grant. On the other hand, the protocol data unit constructor (PDU constructor) accesses the packets of the storage queues of the first storage queue set according to the tx-list and the drop-list, and transmits the packets to a base station through an uplink.

In one embodiment, a scheduling apparatus suitable for a mobile station is provided in the present invention. The mobile station includes a first storage queue set and a PDU constructor. Herein, the first storage queue set has a plurality of storage queues used to receive a plurality of packets of various transmission types. Also, the PDU constructor transmits the packets to a base station through an uplink. The scheduling apparatus includes a classifier, a second storage queue set, and a scheduler. The classifier is connected to the storage queue set to receive all the packets for transmitting. The second storage queue set has a plurality of storage queues and is connected to the classifier, which then classifies and stores the packets temporarily stored by the second storage queue set to the storage queues of the second storage queue set according to a characteristic value of the packets. The scheduler is connected to the second storage queue set. Moreover, the scheduler schedules the packets stored according to an order of all the storage queues of the second storage queue set with an s-list, and generates a tx-list and a drop-list according to a bandwidth grant. Consequently, the PDU constructor accesses the packets of the storage queues of the first storage queue set according to the tx-list and the drop-list, and transmits the packets to a base station through an uplink In one embodiment, a method of real-time uplink traffic scheduling, which is suitable for a mobile station, is provided in the present invention. The method includes temporarily storing a plurality of packets of various transmission types. In addition, a corresponding bandwidth grant is received from an uplink. All the packets for transmitting are scheduled into corresponding connections according to the characteristic value of the packet. The packets of the corresponding connections are scheduled based on an order of the connections to temporarily store the scheduling results with an s-list. Moreover, a tx-list and a drop-list are generated according to the bandwidth grant. The packets are sent through the uplink based on the tx-list and the drop-list.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6A to 6H are schematic diagrams that illustrate an operation method of an s-list and an access of internal data of a scheduler according to an embodiment of the present invention.

FIGS. 7A to 7C are schematic diagrams of experimental results from comparing an embodiment of the present invention and a conventional technique by using a VoIP and a MPEG4 uplink traffic scheduling in a ns-2 simulated 802.16e network.

FIGS. 8A to 8C are schematic diagrams of experimental results from comparing an embodiment of the present invention and the conventional technique by using two MPEG4 uplink traffic schedulings in a ns-2 simulated 802.16e network.

DESCRIPTION OF EMBODIMENTS

The present invention provides a method for real-time uplink traffic scheduling in a mobile station (MS). A bandwidth grant (BW-grant) is granted by a base station (BS) to the mobile station in response to an uplink according to an IEEE802.16e standard, other than a bandwidth value being appointed respectively to each of the service flows from the MS. Thus, a scheduler of the BS must assign appropriate and sufficient bandwidths to all of the mobile stations, and achieve the largest throughput of a system using the scheduling method.

Figure 1:
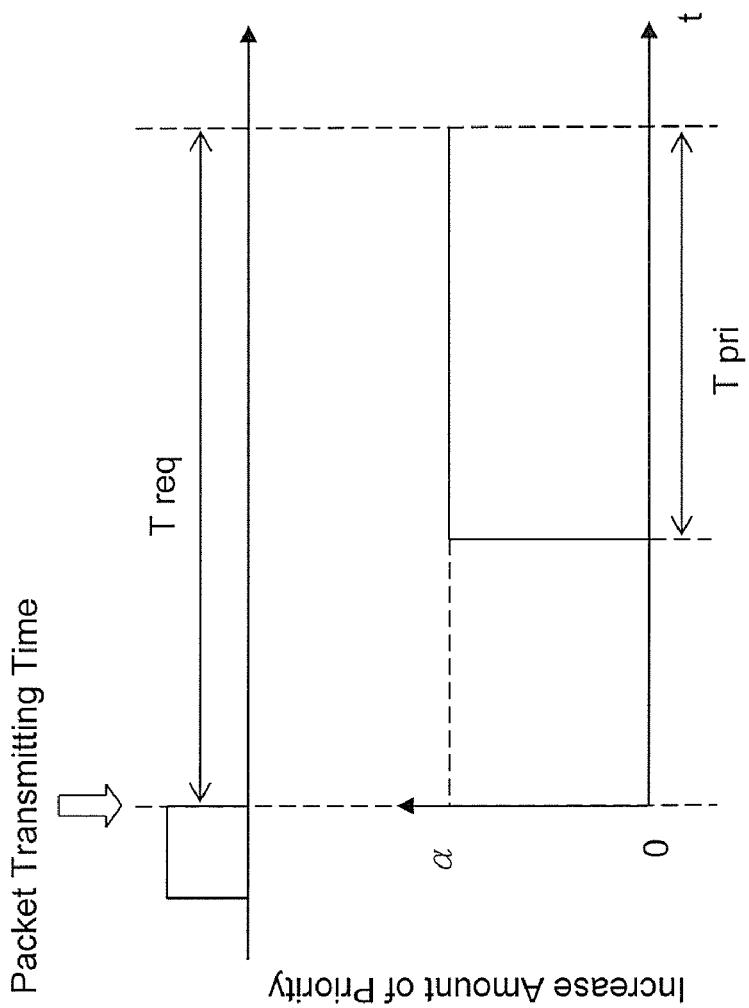
FIG. 1 is a conventional method of adjusting packets, which is a controlling method of increasing priorities of each packet at a predetermined fixed time before their respective decoding times.
Figure 2A:
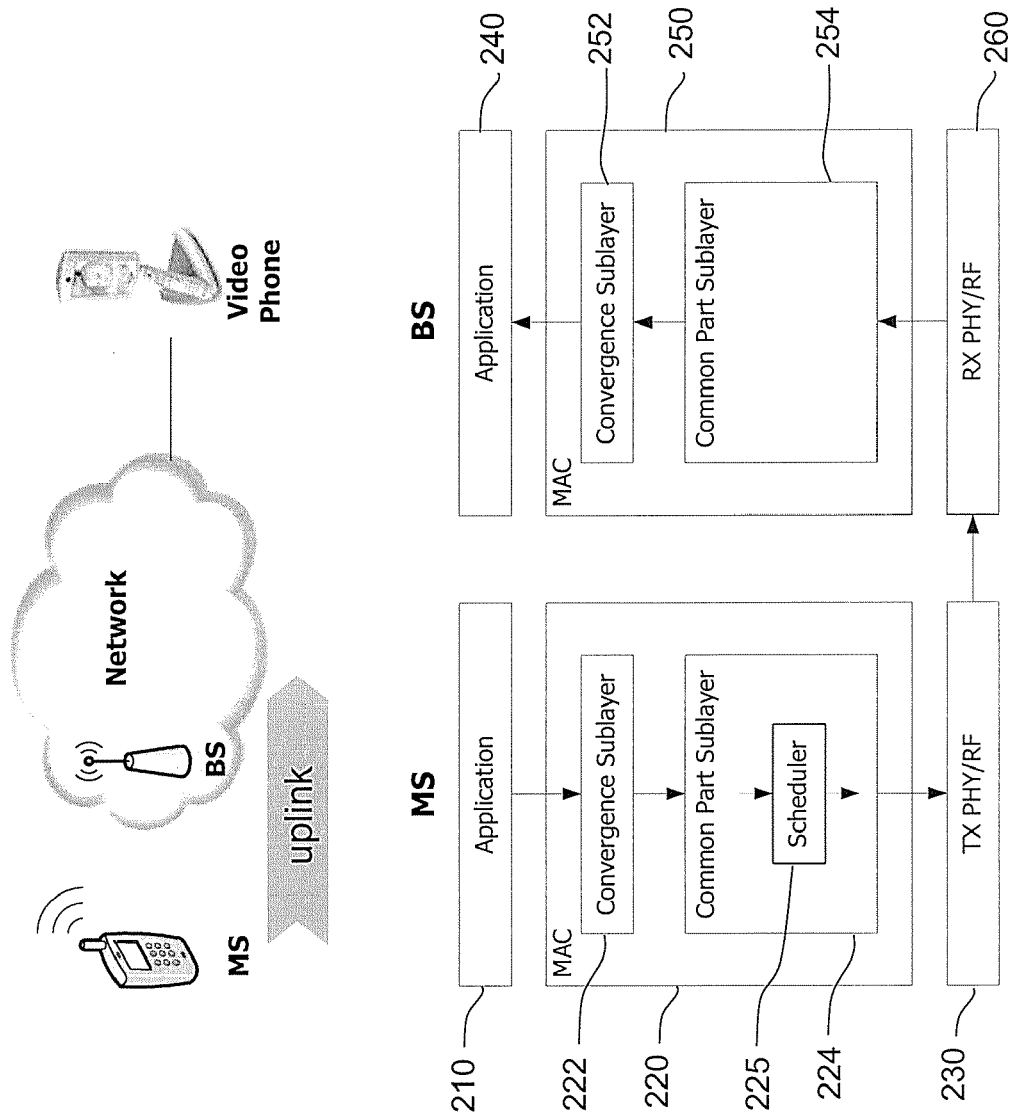
FIG. 2A and FIG. 2B are schematic diagrams of a method for real-time uplink traffic scheduling in a mobile station according to an embodiment of the present invention.

Referring to FIG. 2A, according to the aforementioned embodiment of the method for real-time uplink traffic scheduling in the MS, a real-time traffic scheduling method is designed to determine an order and sizes of packets for transmitting based on a size of bandwidth grant provided by the base station (BS) in the scheduler at the MS end. As illustrated in FIG. 2A, in the MS, an application 210 is connected to a medium access control (MAC) module 220 and the packets are wirelessly transmitted from a transmitting physical layer (TX PHY) 230 to a receiving physical layer 260 of the base station through an uplink. The base station also includes an application 240, which is connected to a MAC module 250. The MAC module 220 of the MS includes a convergence sublayer 222 and a common part sublayer 224. Here, the common part sublayer 224 has a scheduler 225 with a real-time traffic scheduling function. The scheduler 225 can determine the order and the sizes of the packets for transmitting based on the size of the bandwidth grant provided by the base station.

Figure 2B:
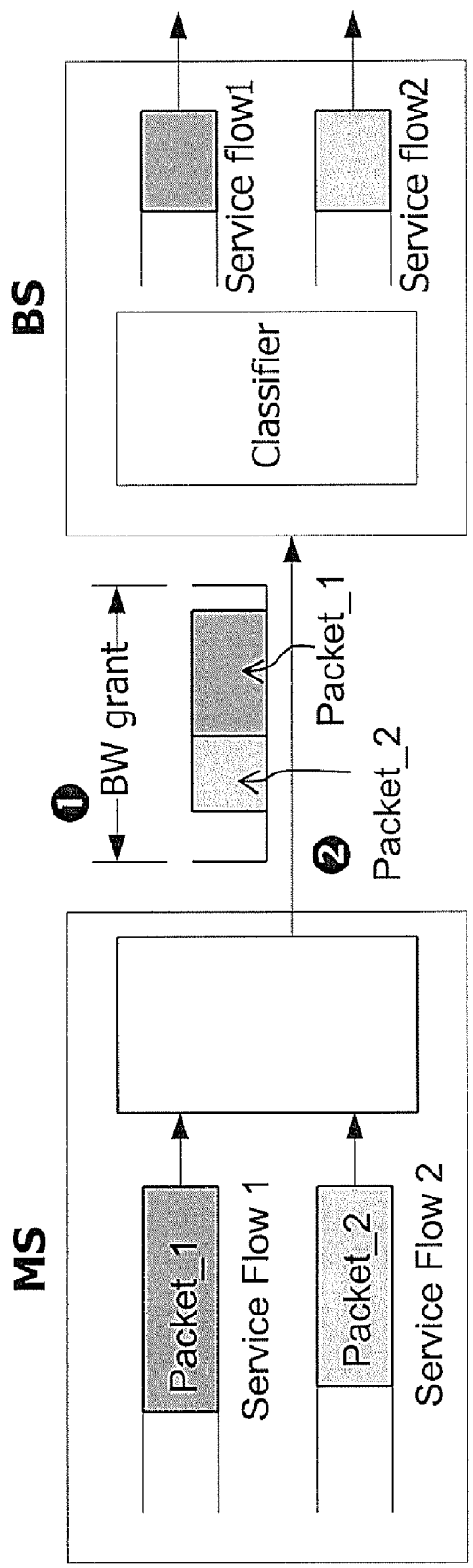

FIG. 2B illustrates the real-time uplink traffic scheduling between the MS and the BS. At the BS end, a BW-grant is provided by the BS in response to the corresponding uplink form each of the mobile stations. On the other hand, the MS needs to, by itself, assign the order and the sizes of the packets for transmitting in the uplink service flow. For example, a packet_1 of a service flow 1 and a packet_2 of a service flow 2 are scheduled into the BW-grant, and the packet_1 of the service flow 1 and the packet_2 of the service flow 2 are obtained after the classification by the classifier of the BS.

The present invention provides an embodiment of a real-time uplink traffic scheduling apparatus in the mobile station. The apparatus includes a content-aware classifier and a priority-enhanced scheduler. The classifier receives a plurality of inputs from real-time service flows, and the classifier classifies the data into corresponding priority connections based on the contents of the service flows. The scheduler schedules the packets according to, at least, a bandwidth grant byte size, priorities of the connections, decoding times corresponding to transmit the packets desired to transmit, and/or real-time factors. Within the limitation of the total bandwidth grant provided by the BS, types and the order of the packets for transmitting are scheduled accordingly, such that the packets received by the BS or the decoders can satisfy the requirements of the real-time factors, and the greatest amount of effective data can be decoded.

Moreover, the present embodiment also considers the decoding time of each packet in the real time service flow and ensures the packets with high priorities will be sent before the end of the decoding times. Besides, the present embodiment utilizes the decoding times and sizes of the packets to estimate a duration, such that the packets with the closer decoding times and a second-high priority can be scheduled before the start transmit time begins. Therefore, the packets with high priorities are not always transmitted first, so that more effective packets can be scheduled.

In other words, the present embodiment considers the decoding times and an estimated start transmit time of the packets instead of transmitting the packets to the BS merely because they have higher priorities. Therefore, the order of packets for transmitting will not be affected by whether the BW-grant is greater or smaller than the BW-request.

The scheduling method of the present embodiment does not require α to adjust priorities, as required in the conventional art. Moreover, the present embodiment ensures the packets with higher priorities will be scheduled at first, to avoid the situation caused in the conventional art that the packets with higher priorities can not be effectively scheduled when the a is unreasonably increase by the packets with lower priorities.

Figure 3A:
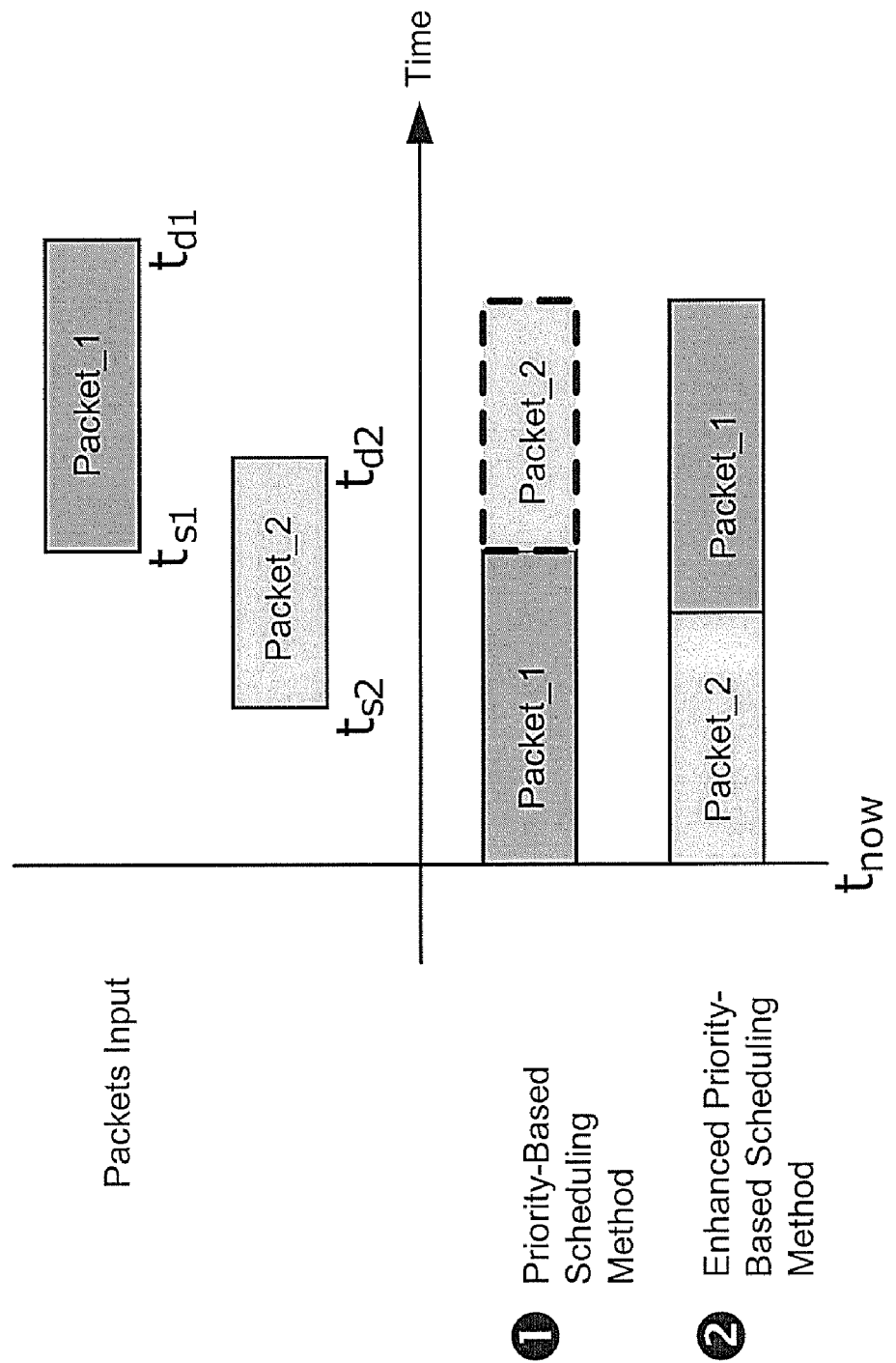
FIG. 3A and FIG. 3B are schematic diagrams of comparison results of a priority-enhanced scheduler, and a priority-based scheduling method and/or a decoding time first scheduling method applied in the method for real-time uplink traffic scheduling in the MS according to the present embodiment.
Figure 3B:
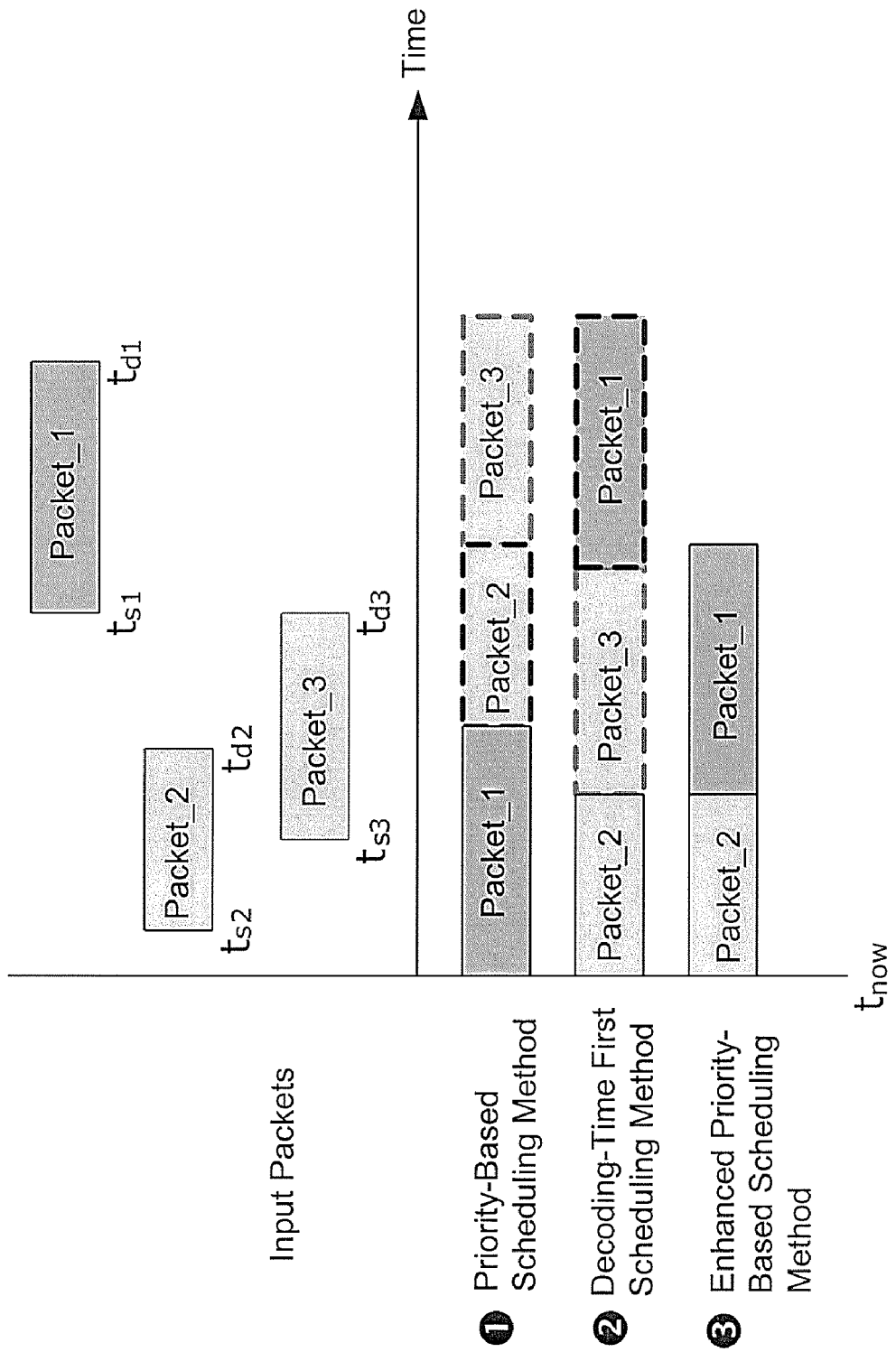

FIG. 3A and FIG. 3B are schematic diagrams of comparison results of a priority-enhanced scheduler and a priority-based scheduling method and/or a decoding-time-based scheduling method applied in the method for real-time uplink traffic scheduling in the MS according to the embodiment of the present invention. In the following, FIG. 3A and FIG. 3B are illustrated with the packet 1 (labeled as packet_1), the packet 2 (labeled as packet_2), and the packet 3 (labeled as packet_3) that belong to different service flows.

Referring to FIG. 3A, in the method of real-time uplink traffic scheduling provided in the present embodiment, except for firstly considering the packets with higher priorities to satisfy the demand for transmitting before the end of the decoding time, transmit it is also considered that more and more packets with lower priorities can be transmitted to the BS as well. As shown in FIG. 3A, the priority of the packet_1 is higher than that of the packet_2, and the decoding time of the packet_1 is $t_{d1}$ while the decoding time of the packet_2 is $t_{d2}$.

When scheduling with the priority-based scheduling method, if the packet_1 is sent first and the packet_2 is sent next, it will occur that the packet_2 can not be sent to the BS before $t_{d2}$. When scheduling with the enhanced priority-based scheduling method, the order of transmitting is to transmit the packet_2 first and then the packet_1, so that both packets may be sent to the BS before the decoding times $t_{d2}$ and $t_{d1}$. The present embodiment schedules the packet_1 with high priority first, and schedules the packet with second-high priority within the time interval ($t_{now}$, $t_{S1}$) before transmitting the packet_1. In the present embodiment, the packet_2 may be scheduled, so the order of transmitting is to transmit the packet_2 first and the packet_1 next, such that both packets can be sent to the BS before $t_{d2}$ and $t_{d1}$. As a consequence, the number of packets sent will be increased.

Referring to FIG. 3B, here, the priority of the packet_1 is higher than that of the packet_2, and the priority of packet_2 is higher than that of the packet_3. Moreover, the decoding time of the packet_1 is $t_{d1}$, the decoding time of the packet_2 is $t_{d2}$, and the decoding time of the packet_3 is $t_{d3}$.

According to the priority-based scheduling, only the packet_1 can be sent to the BS before $t_{d1}$. If the decoding-time-based scheduling is used, only the packet_2 can be sent to the BS before $t_{d2}$. On the contrary, the packet_1 with higher priority can not be sent to the BS before $t_{d1}$. The present embodiment schedules the packet_1 with higher priority; however, the packet_2 may be scheduled in the time interval $(t_{now}, t_{S1})$ before transmitting the packet_1, and the packet_3 will not be sent because the remaining bandwidth is not sufficient. Therefore, the order of transmitting is, first, the packet_2, and then the packet_1, so that the time interval $(t_{now}, t_{S1})$ can be used efficiently to increase the amount of effective packets sent to the BS.

Figure 4A:
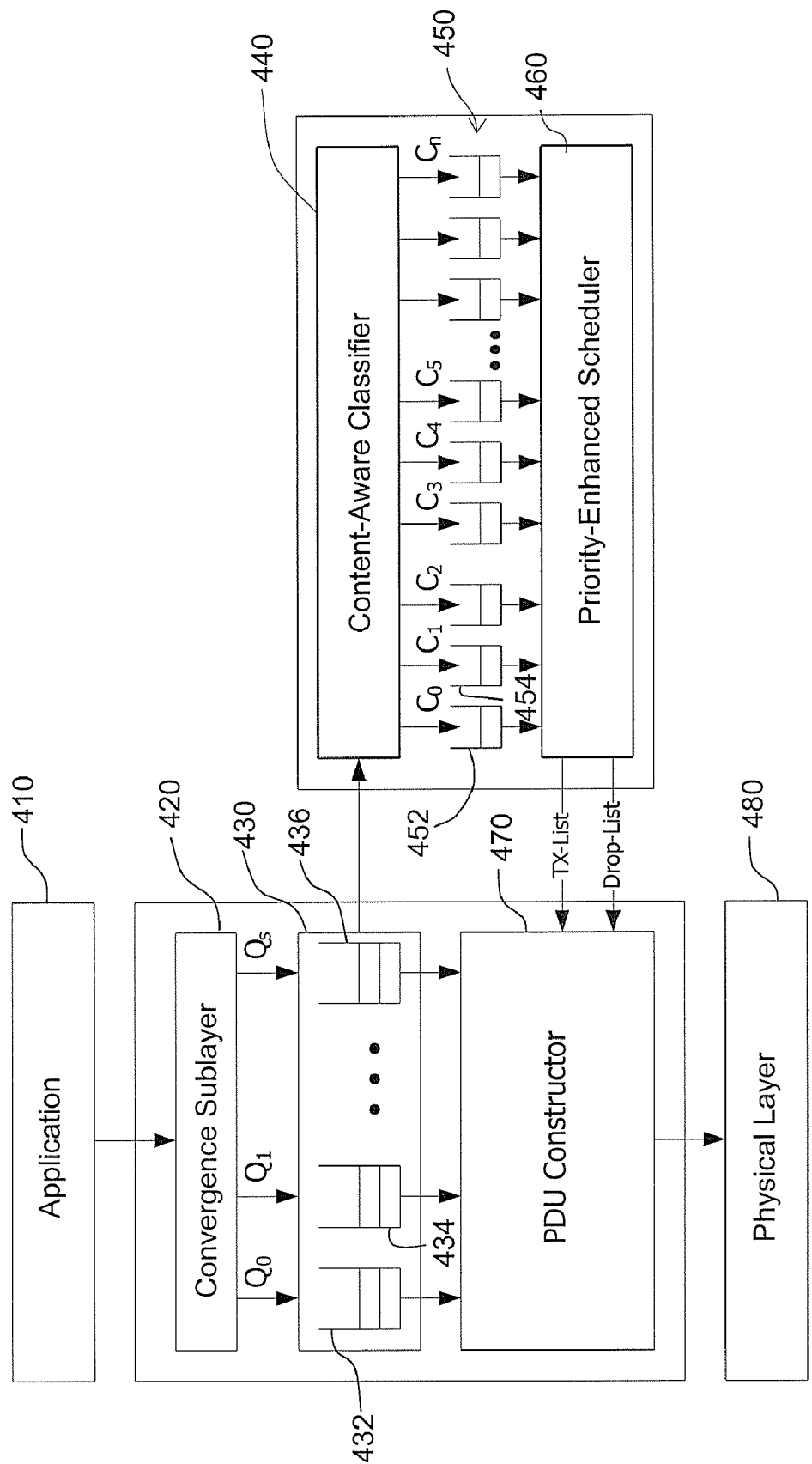
FIG. 4A and FIG. 4B are respectively a schematic composition diagram of an apparatus for real-time uplink traffic scheduling in the MS and a flow diagram of an internal operation thereof according to the present embodiment.
Figure 4B:
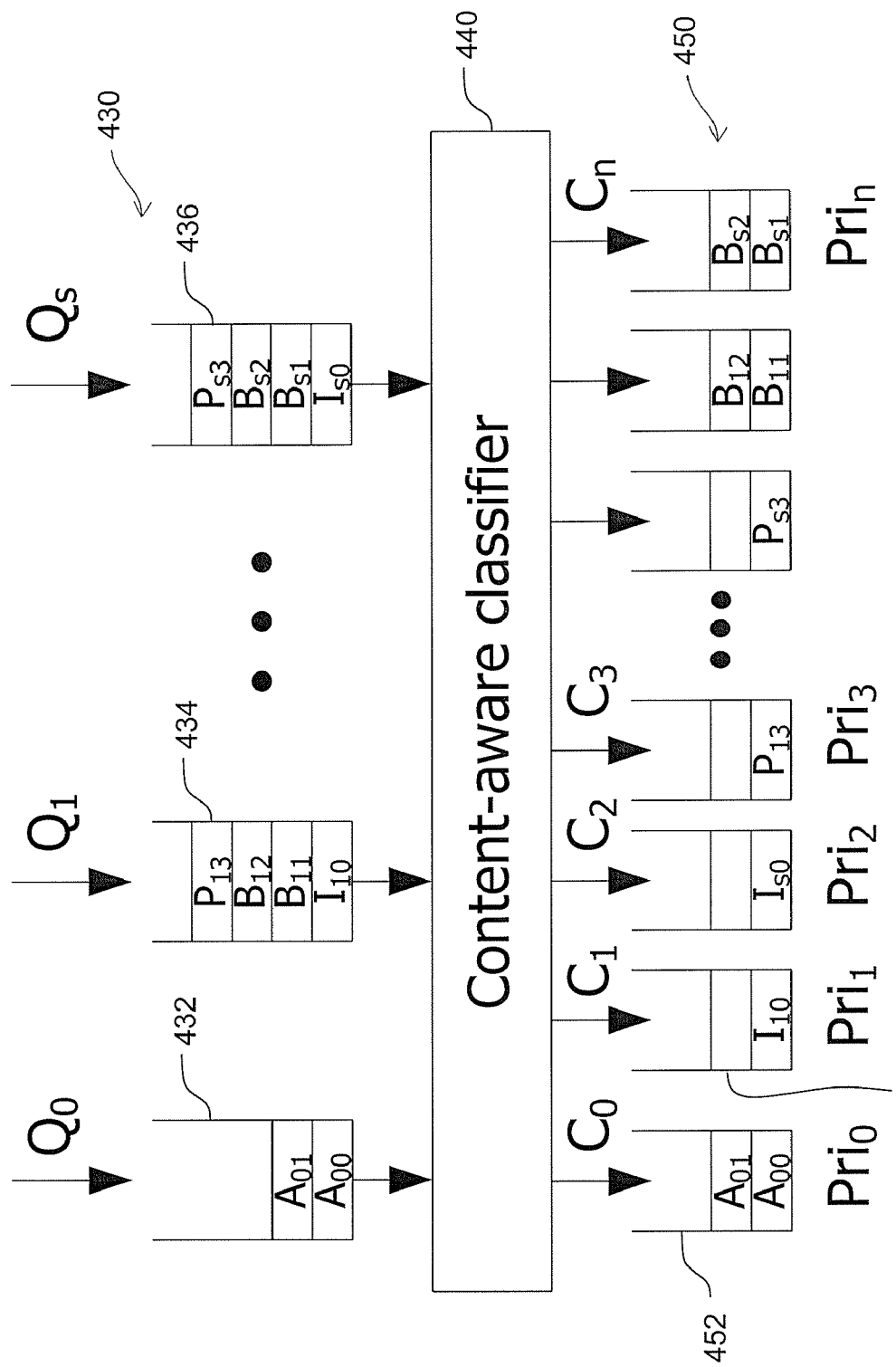
Figure 5:
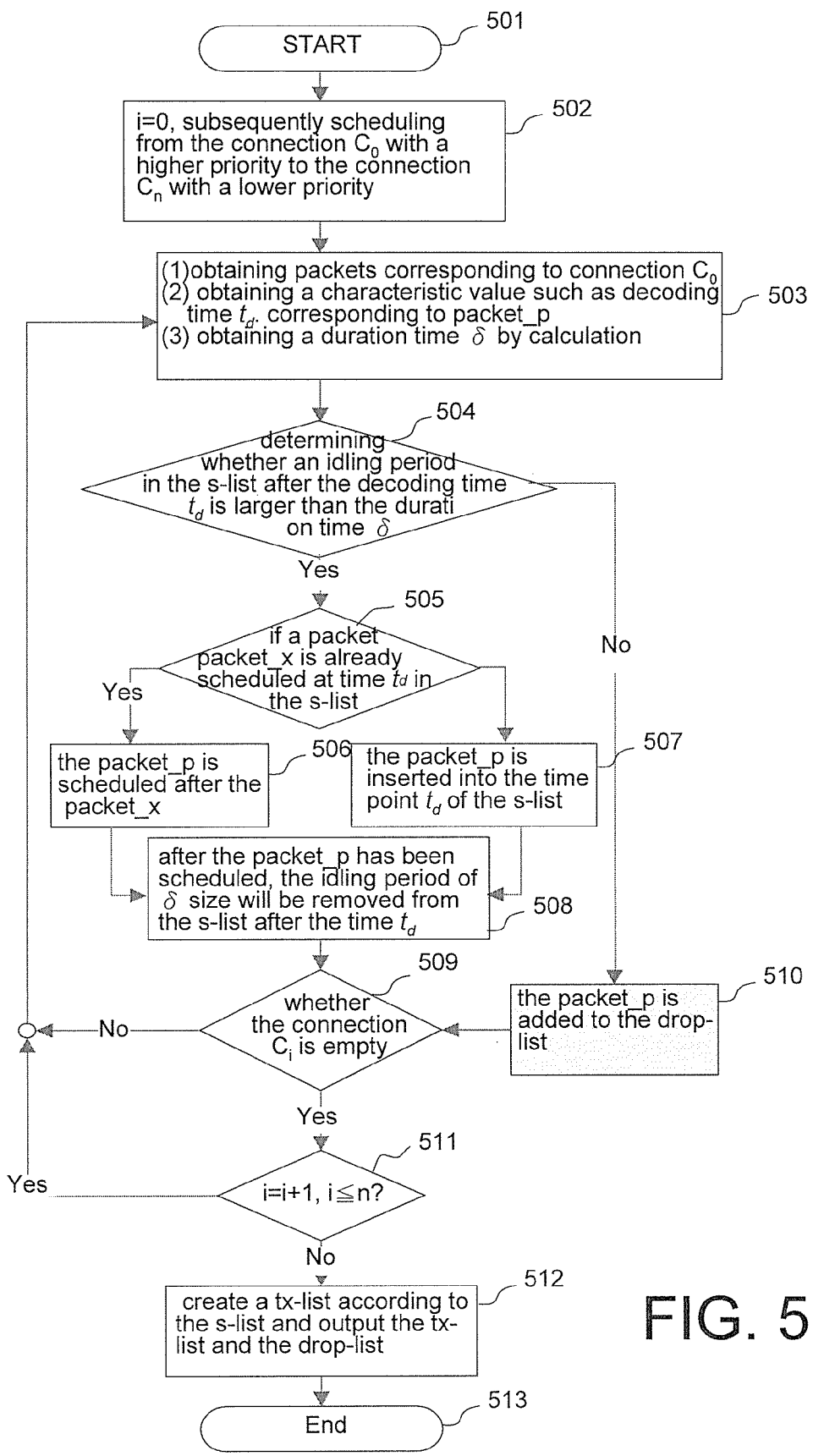
FIG. 5 is a schematic diagram of a method of real-time traffic scheduling according to an embodiment of the present invention.

FIG. 4A, FIG. 4B and FIG. 5 illustrate an embodiment of a real-time uplink traffic scheduling apparatus in a MS and a detailed flow diagram of an internal operation thereof.

Firstly, referring to FIG. 4A, an application 410 is connected to a MAC module in the MS. The MAC module includes at least a convergence sublayer 420, a storage queue set 430, used to store packets, and a PDU constructor (Protocol Data Unit Constructor) 470. The storage queue set 430, which corresponds to $Q_0 \sim Q_S$, has a total number of S+1. Then, the storage queue set 430 transmits the packets to a physical layer 480 through the PDU constructor 470 and transmits the packets to the BS through the uplink. In the present embodiment, an apparatus having real-time traffic scheduling includes a content-aware classifier 440, a storage queue set 450, which corresponds to $C_0 \sim C_n$ and has a total number of n+1 connections, and a priority-enhanced scheduler 460.

The classifier 440 receives inputs from a plurality of service flows sent from the storage queue set 430. The classifier 440 classifies the data to connections with corresponding priorities according to the contents of the service flows, and temporarily stores the service flows in the storage queue set 450 of corresponding connections. Then, the priority-enhanced scheduler 460 schedules the packets within the service flows according to, at least, a bandwidth grant byte size, priorities of the connections, decoding times for transmitting the packets, and/or real-time factors. Within the limitation of the total bandwidth grant provided by the BS, types and the order of the packets for transmitting are scheduled accordingly, and the packets received by the BS or the decoders can satisfy the requirements of the real-time factors, and greatest amount of effective data can be decoded. The details are illustrated in the following.

When the MS receives the inputs, the classifier 440 first assigns the data received to the corresponding connections $C_n$ according to the characteristics of the packets of the service flows. The corresponding connections are, for example, $C_0$, $C_1$, $C_2$, ..., and $C_n$, etc. The priorities of connections are assigned according to the importance of the packets. The priorities of assignment are, for example, $P_{C0} > P_{C1} > P_{C2} > \ldots > P_{Cn}$.

Every packet has its own decoding time $t_d$, start transmit time $t_s$, and duration $\delta$. The duration $\delta$ is determined by the packet size and the bandwidth grant byte size provided by the BS in the start of scheduling. The calculation method is:

$$\text{Grant\_Traffic\_Rate}, \hat{G} = BW_{grant}\left(\frac{\text{byte}}{\text{frame}}\right) \times 200\left(\frac{\text{frame}}{\text{sec.}}\right)$$

-continued $$\delta = \frac{\text{packet\_size}}{\hat{G}}$$

$$t_s = t_d - \delta$$

Herein, the minimum reserved rate $\leq$ grant_traffic_rate $\hat{G} \leq$ maximum sustained rate, frame is frame, and byte is byte.

The scheduler uses a structural series, which is called an s-list, to temporarily store the scheduling results from the operation of the scheduler. The priority-enhanced scheduler 460 generates a reverse order of the s-list to produce the tx-list. Afterward, the priority-enhanced scheduler 460 outputs the tx-list and the drop-list to finish the scheduling. Next, the priority-enhanced scheduler 460 outputs the tx-list and the drop-list to the PDU constructor 470. The PDU constructor 470 can access and transmit the packets from the storage queue set 430 according to the order on the tx-list. However, the packets directed in the drop-list may not be sent as the remaining bandwidth grant is not sufficient.

FIG. 4B described the transmitting of a plurality of real-time service flows from the storage queue set 430 to the classifier 440. For example, a storage queue 432 within the storage queue set 430 stores $A_{01}$ and $A_{00}$, a storage queue 432 stores $P_{13}$, $B_{12}$, $B_{11}$, and $I_{10}$, and a storage queue 436 stores $P_{S3}$, $B_{S2}$, $B_{S1}$, and $I_{S0}$. The classifier 440 first assigns the service flows to the corresponding connections, for example, $C_0, C_1, C_2, \ldots,$ and $C_n$, etc, according to the characteristics of the packets in the service flows. The priorities of connections are assigned according to the importance of the packets or priorities of source queues. The priorities of assignment are, for example, $P_{ri0} > P_{ri1} > P_{ri2} > \ldots > P_{rin}$. In other words, the classifier 440 classifies the service flows according to a characteristic value of the packets, for example, types and priorities of source queues. Moreover, as $A_{01}$ and $A_{00}$ correspond to connection $C_0$, they have the highest priority. $I_{10}$ corresponds to $C_1$, thus has the second-highest priority. Other packets are respectively assigned to the corresponding connections and the priorities thereof, and are stored in the storage queue set 450 as illustrated in the diagram.

The present embodiment has a method for real-time traffic scheduling as illustrated in FIG. 5. After each uplink receives the bandwidth grant byte size provided by the BS, the priority-enhanced scheduler is initiated to start scheduling (step 501). The priority-enhanced scheduler subsequently schedules from the connection $C_0$ of high priority to the connection $C_n$ of low priority. The packets are retrieved starting from i=0 (that is, the connection $C_0$) (step 502), and the packet and the characteristic value thereof are respectively called packet_p and $t_d$. The duration $\delta$ is calculated with the $BW_{grant}$ provided by the BS (step 503). The characteristic value of the packet_p includes classifying the packet_p according to both or one of the types of packets and the priorities of the source queues.

The scheduler uses a structural series, which is called an s-list, to temporarily store the scheduling results from an operation of the scheduler. Firstly, determine whether the s-list has been scheduled into the scheduler, and whether there is sufficient idling period (step 504). The idling period must be greater than the size of the duration $\delta$ of the packet for the packet to be scheduled. If there is sufficient idling period to schedule the packet, then the time point of the packet, $t_d$, is checked to see whether a packet with higher priority has been scheduled in the s-list, or the idling period can be utilized.

If a packet, which is named as a packet_x, is already scheduled at time $t_d$ (step 505), then the packet_p is scheduled after the packet_x (step 506). If the time $t_d$ is a usable idling period, then the packet_p is inserted into the time point $t_d$ of the s-list. (step 507) After the packet_p has been scheduled, the idling period of δ size will be removed from the s-list after the time $t_d$ (step 508). If there is no sufficient idling period to schedule this packet, then the packet_p is added to the drop-list (step 510).

Hence, the packets in the connection $C_0$ are retrieved in sequence until all the packets are checked (step 509). Next, the connection $C_1$ is processed until all the packets in the connections have been checked (step 511).

After all the packets in the connections $C_0, C_1, C_2, \ldots,$ and $C_n$ have been checked, the scheduler outputs the s-list in a reverse order to create the tx-list. The priority-enhanced scheduler outputs the tx-list and the drop-list (step 512) to complete the scheduling (step 513).

After the scheduler outputs the tx-list and the drop-list to the PDU constructor, the PDU constructor may retrieve and transmit the packet contents from the queues according to the order of the tx-list. However, the packet contents directed in the drop-list may not be sent if the remaining bandwidth grant is not sufficient.

The operation method of the s-list in the above-mentioned scheduler will be illustrated with figures in FIG. 6A to FIG. 6H. The packet_1, the packet_2, and the packet_3 belong to different service flows, and each has a different priority, that is, the sizes of the priorities is $P_{packet\_1} > P_{packet\_2} > P_{packet\_3}$. The respective factors are presumed as the following:

Packet_1: Priority=1, $t_d$=8, $\delta_1$=3
Packet_2: Priority=2, $t_d$=3, $\delta_1$=2
Packet_3: Priority=3, $t_d$=6, $\delta_1$=3

Figure 6A:
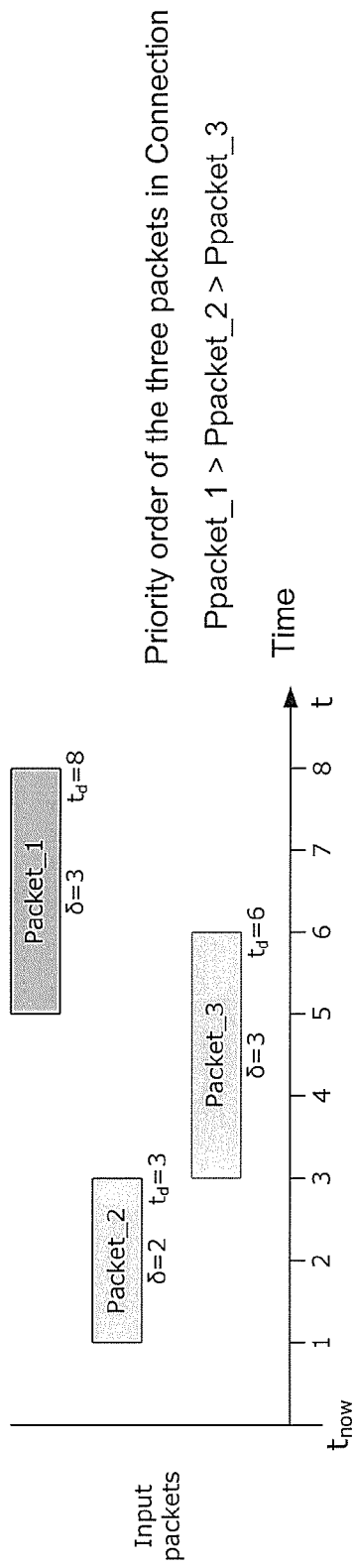
Figure 6B:
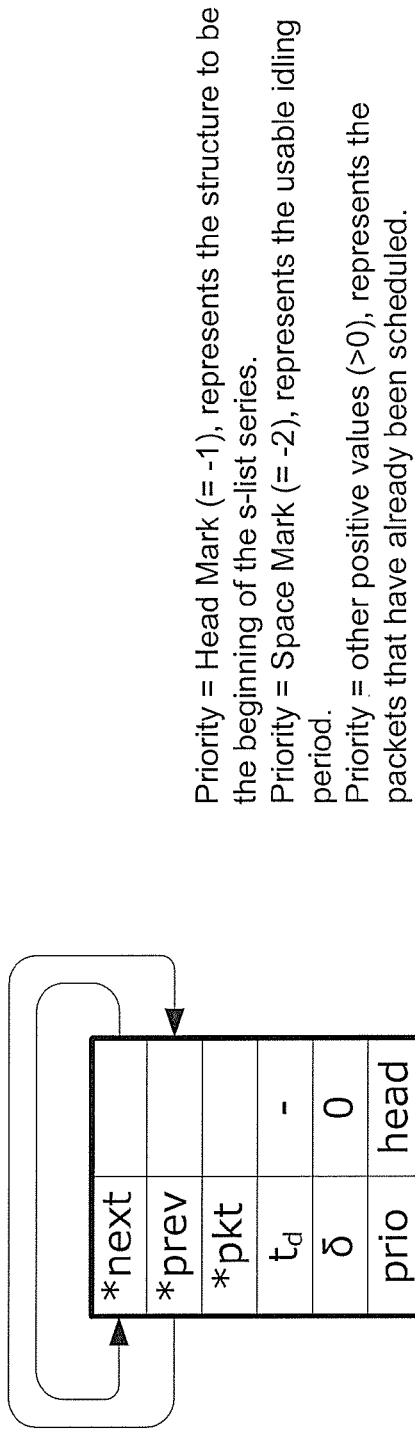

In the scheduler, the structure in FIG. 6B is used to store the characteristics of the packets. The structure includes a double-linked list index, where the "*next" index directs to the next structure and the "*prev" index directs to the previous structure. The *next index is used as an index packet of the scheduler and the *prev index is used to reversely output the tx-list series. The structure further includes an index of the packet content, the factors $t_d$ and δ of the packet, and the priorities of the packet (such as Prio in the Fig.). Moreover, the priority values are used to distinguish the contents represented by the structure.

Priority=Head Mark (=−1), represents the structure to be the beginning of the s-list series.

Priority=Space Mark (=−2), represents the usable idling period.

Priority=other positive values (>0), represents the packets that have already been scheduled.

When the scheduler initiates, the head index is used to direct to the structure of Prio=Head, and the content is the idling period.

Figure 6C:
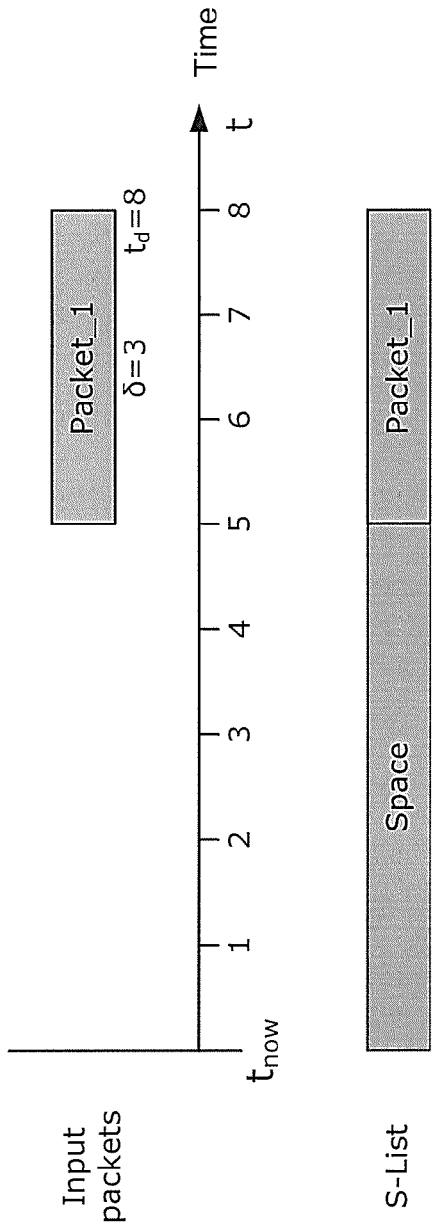

As illustrated in FIG. 6C, the packet_1 can be firstly scheduled according to the order of priorities. Since the entire s-list is the usable idling period, so after the packet_1 is added, the disposition of the s-list is illustrated in FIG. 6C. The content of the s-list means that in the eight scheduling periods, the packet_1 occupies three units of duration, so the subsequent five units of duration may be used to schedule other packets, such as the space illustrated in the figure.

Figure 6D:
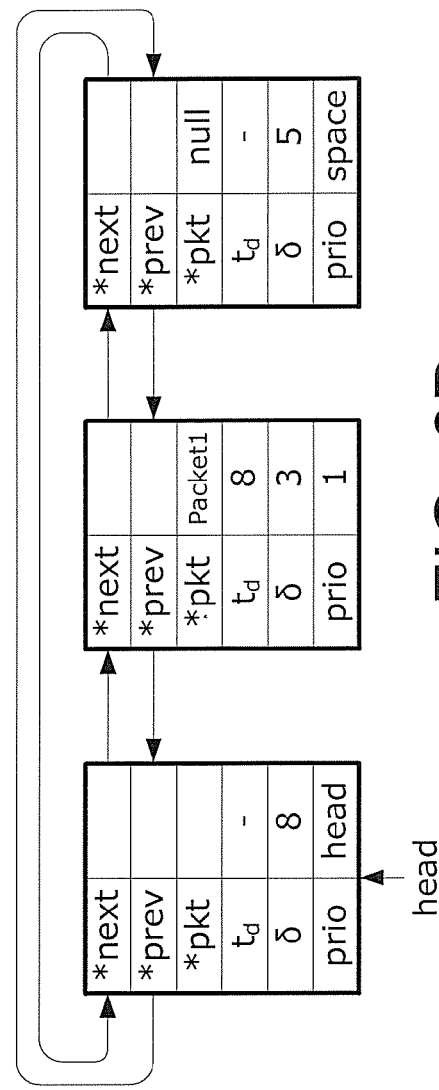
Figure 6E:
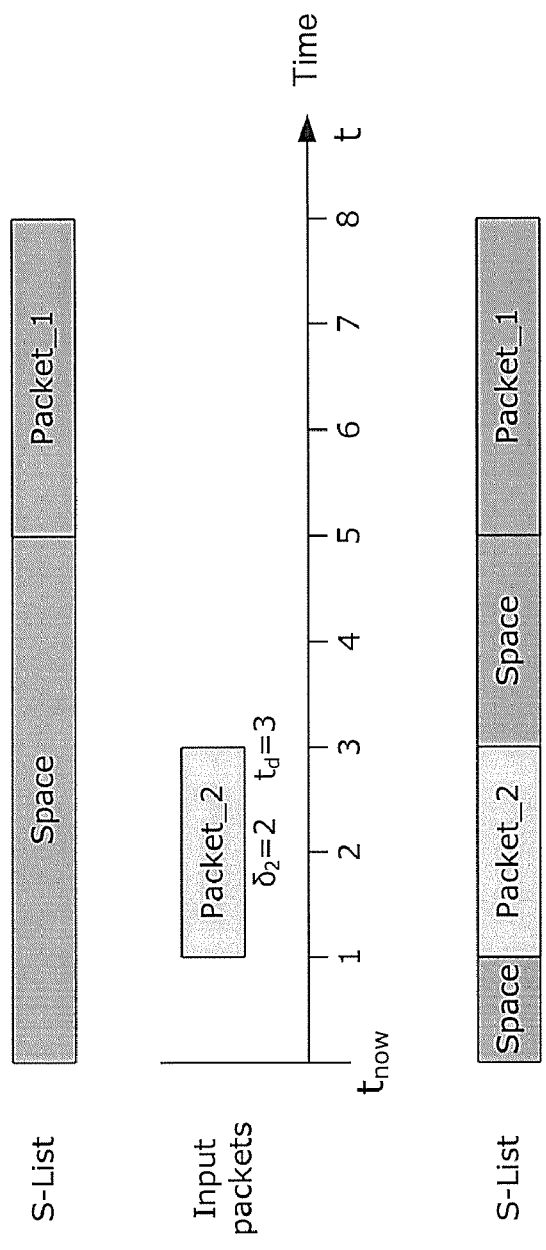
Figure 6F:
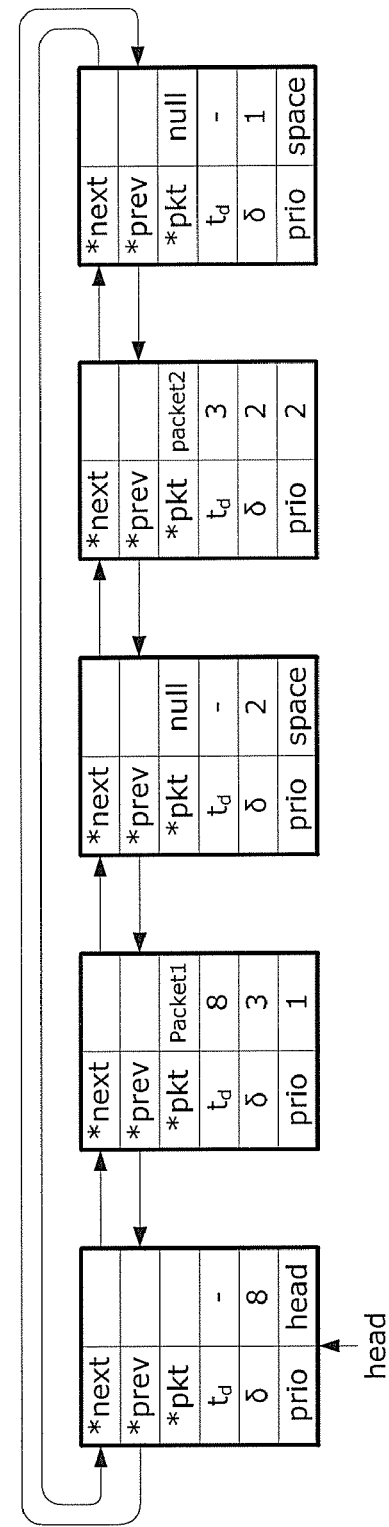

Next, referring to FIG. 6D, after the packet_2 has been scheduled, the s-list has a three units of duration after the time point $t_{d2}$=3. As the duration of the packet_2 has a duration $\delta_2$=2, the duration is sufficient for the packet_2 to be scheduled. The s-list will be illustrated as FIG. 6E after the packet_2 has been scheduled by the scheduler. The content of the s-list in this figure means that in the eight scheduling periods, the packet_1 occupies three units of duration, and there are two subsequent units of idling period. Afterward, the packet_2 occupies two units of duration, which leaves 1 unit of idling period.

Lastly, the packet_3 is scheduled. Referring to FIG. 6G, although the time point $t_{d3}$=6 of the s-list is already scheduled with the packet_1, there are still three subsequent units of idling period, and the duration of the packet_3 is $\delta_3$=3, so the packet_3 will be scheduled into the space after $t_{d3}$=6. Thus, three units of idling period are removed after the time point $t_{d3}$=6, and the s-list after the packet_3 has been scheduled by the scheduler is illustrated as FIG. 6H.

After the scheduler completes the scheduling, the *prev is used as an index to retrieve the packets in order. That is, the tx-list is {packet_2, packet_3, packet_1}, and the drop-list is an empty series { }, which means that all three packets can be sent.

The following illustrates the method for real-time uplink traffic scheduling in the mobile station according to an embodiment of the present invention.

Figure 7A:
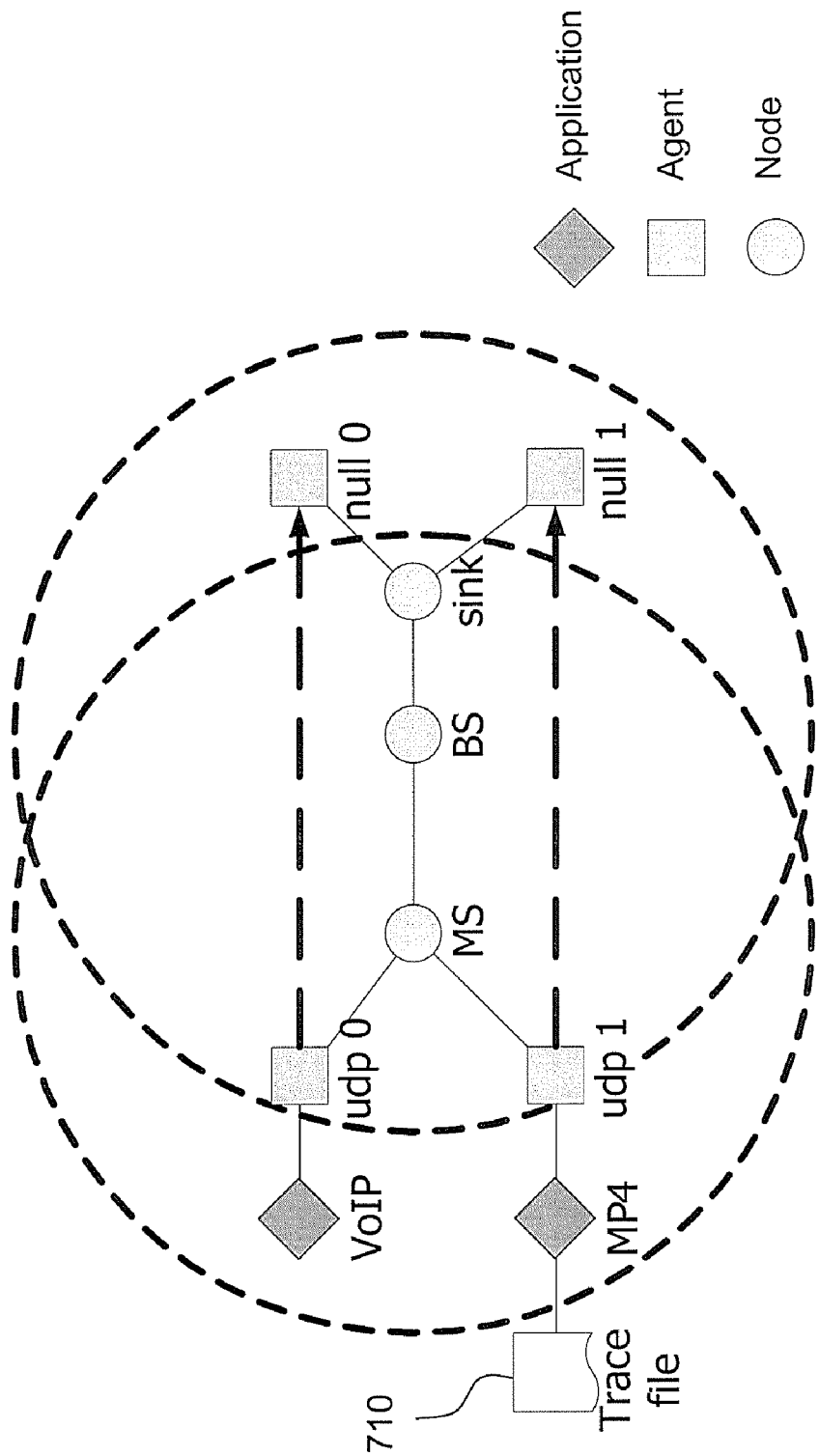
Figure 7C:
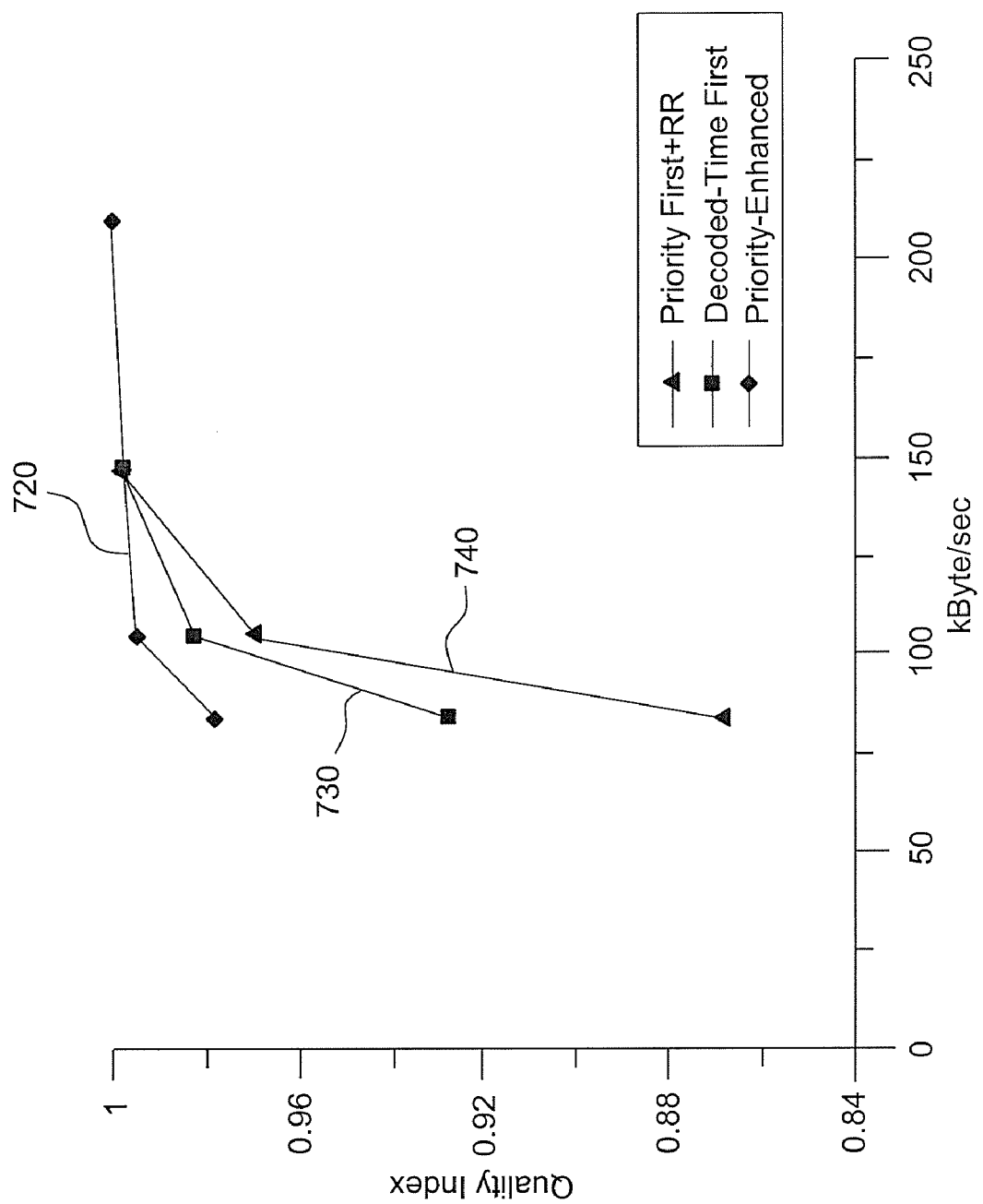

FIG. 7A to FIG. 7C illustrate a Voice over IP (VoIP) and a MPEG4 uplink traffic scheduling, where a 802.16e network is simulated with a ns-2 and a topology of the network is illustrated as FIG. 7A. Herein, the network topology includes a MS and a BS, and a 802.16e OFDMA v2.1 protocol provided by WiMAX forum is used between the MS and the BS. The application (such as the VoIP and the MPEG4 as shown in the figure) simulates an uplink that includes the input flow containing an audio and a video.

The audio flow is G.711, with 64 kbps, and every PCM-frame has 80 bytes, a payload of 160 bytes, and 50 packets/per second.

The video stream is MPEG4 Stream, which can be obtained from the StartWarsIV MPEG4 high quality trace file, which is G(12,3) format and 25 frames per second.

The four types of maximum sustained traffic rates assigned to the MS by the simulated BS are respectively 84 kbytes/sec, 105 kbytes/sec, 147 kbytes/sec, and 210 kbytes/sec. Moreover, the packet delay limit is 120 milliseconds (ms). In the following, three scheduling methods are used to perform a 40 second simulation.

Method 1 applies the priority-based and round robin scheduling method, where the service flow is divided into two series and the order of priorities is $P_{audio} > P_{video}$.

Method 2 applies the decoding-time-based scheduling method, where the packets with the closest decoding times are scheduled first, and the packets with expiring decoding times are dropped.

Method 3 is the priority-enhanced scheduling method of the present embodiment. The audio flow corresponds to $C_0$, and the priority is $P_{C0}$. The I-frame, P-frame, and B1/B2-frame of the video flow correspond to $C_1, C_2,$ and $C_3$ respectively, and the priorities correspond to $P_{C1}, P_{C2},$ and $P_{C3}$ respectively. The order of the priorities of the four connections is $P_{C0} > P_{C1} > P_{C2} > P_{C3}$.

The evaluation method is to calculate the frame number that satisfies the decoding times after the BS end receives the packets, and divide by the total frame number to obtain an evaluation index. The quality index obtained is as follows:

$$\text{Quality\_Index} = \frac{\text{decoded\_frame\_number}}{\text{total\_frame\_number}}$$

The result of comparing a bandwidth grant of 84 kbytes/sec is illustrated in FIG. 7B.

The packets of the VoIP can all be sent successfully. As for the MP4 series portion, the priority-enhanced scheduling method of the present embodiment can have 5% to 11% more of successful frames than using the other two methods.

Referring to FIG. 7C, the four different bandwidth grants assigned by the BS are compared, and the result of the quality index of MP4 is illustrated in the diagram. When the BS assigns different bandwidth grants and transmits them using different scheduling methods, the maximum frame index can be decoded by the decoders. As illustrated in the result, although the quality index reduces as the bandwidth grant provided by the BS decreases, the priority-enhanced scheduling method used in the present embodiment has the quality index labeled as 720. Moreover, when comparing with the result of using the decoding-time-based scheduling method (labeled as 730 in the figure), the priority-enhanced scheduling method can have about 5% more of MP4 frames. When comparing with the priority-based and the round robin scheduling method (labeled as 740 in the figure), the priority-enhanced scheduling method can obtain more than 11% of MP4 frames.

Figure 8A:
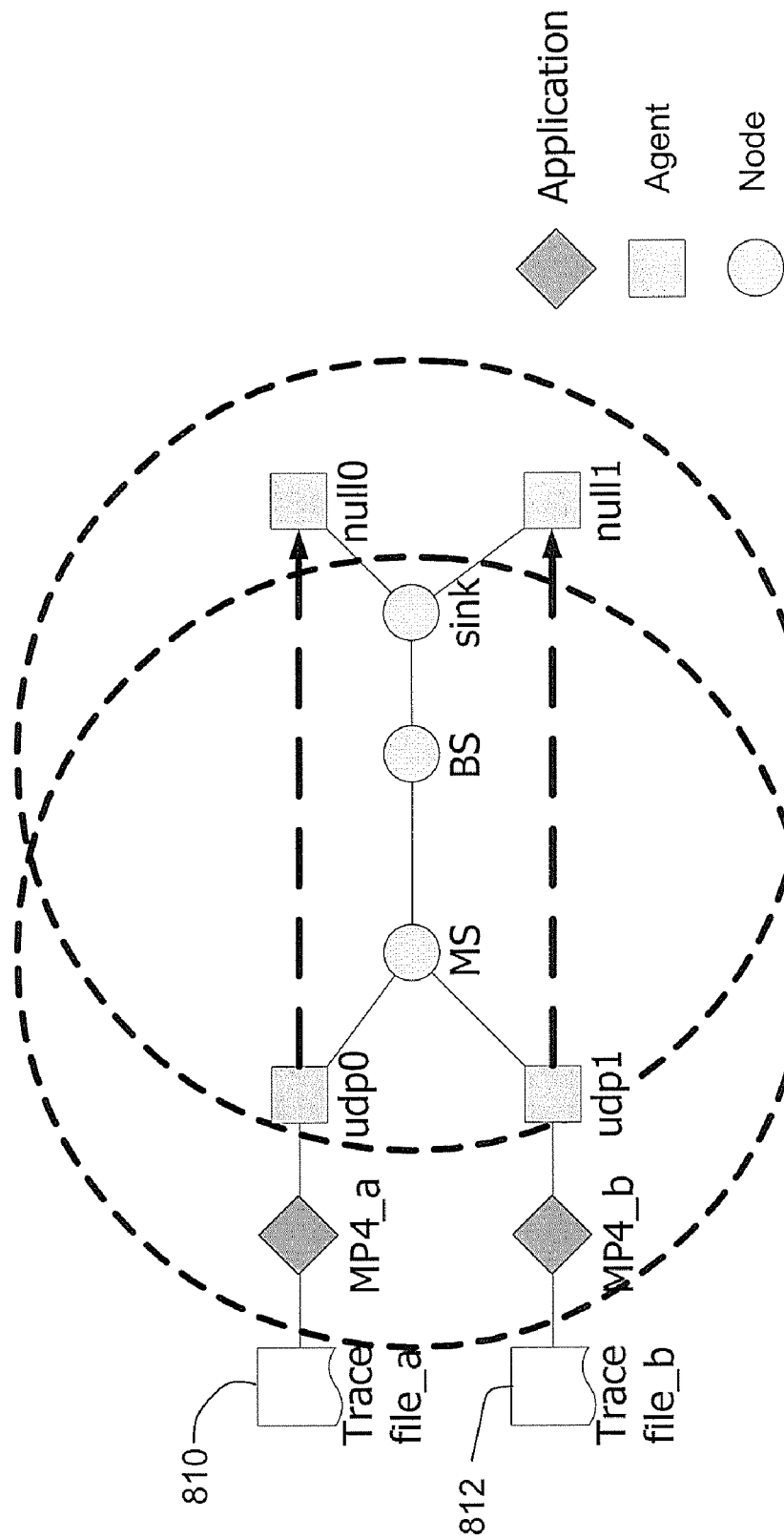
Figure 8C:
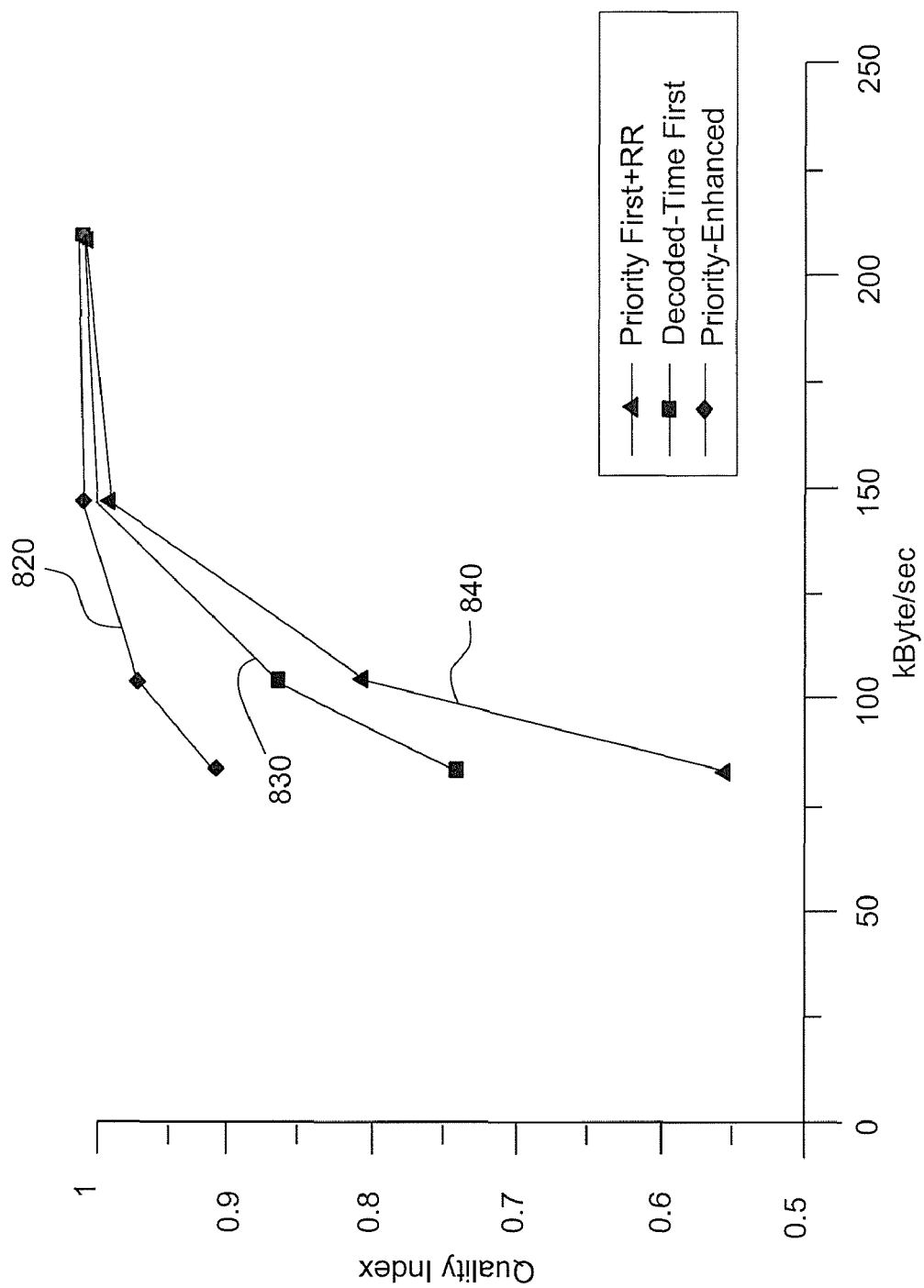

FIG. 8A to FIG. 8C are directed to two MPEG4 uplink traffic schedulings that use an ns–2 to simulate a 802.16e network, and a topology of the network is illustrated in FIG. 8A. Herein, the network topology includes a MS and a BS, and a 802.16e OFDMA v2.1 protocol provided by WiMAX forum is used between the MS and the BS. The application simulates an uplink input flow with an uplink flow having two video flows.

Video A flow is the MPEG4 stream having the data provided from the StartWarsIV MPEG4 high quality trace file.

Video B flow is the MPEG4 stream having the data provided from the Jurassic Park I medium quality trace file.

The above flows both have the G(12.3) format and 25 frames/second.

The four types of maximum sustained traffic rates assigned by the simulated BS are respectively 84 kbytes/sec, 105 kbytes/sec, 147 kbytes/sec, and 210 kbytes/sec, and the packet delay limit is 120 milliseconds (ms).

In the following, three scheduling methods are used to perform a 40 second simulation.

Method 1 is to apply the priority-based and round robin scheduling method, which divides the service flows into two series and the order of priorities is $P_{stream\_A} = P_{stream\_B}$.

Method 2 applies the decoding-time-based scheduling method, where the packets with the closest decoding times are scheduled first, and the packets with expiring decoding times are dropped.

Method 3 is the priority-enhanced scheduling method of the present embodiment. The I-frame, P-frame, and B1/B2-frame of the video flow A correspond to $C_0$, $C_2$, and $C_4$ respectively, and the priorities correspond to $P_{C0}$, $P_{C2}$, and $P_{C4}$ respectively. The I-frame, P-frame, and B1/B2-frame of the video series B correspond to $C_1$, $C_3$, and $C_5$ respectively, and the priorities correspond to $P_{C1}$, $P_{C3}$, and $P_{C5}$ respectively. The order of the priorities of the six connections is $P_{C0} > P_{C1} > P_{C2} > \ldots > P_{C5}$.

The comparison result of having a 84 Kbyte/sec bandwidth grant is illustrated in FIG. 8B. The quality index of the comparison result of the four different bandwidths assigned by the BS is illustrated in FIG. 8C. When the BS assigns different bandwidth grants and transmits them using different scheduling methods, the decoders can decode the maximum frame index. As shown in the result, although the quality index reduces as the bandwidth grant by the BS decreases, the priority-enhanced scheduling method used in the present embodiment is labeled as 820. Moreover, when comparing with the result of the decoding-time-based scheduling method (labeled as 830 in the figure), the priority-enhanced scheduling method can have about 17% more of MP4 frames. When comparing with the priority-based and the round robin scheduling method (labeled as 840 in the figure), the priority-enhanced scheduling method can obtain far more than 36% of MP4 frames.

Figure 9:
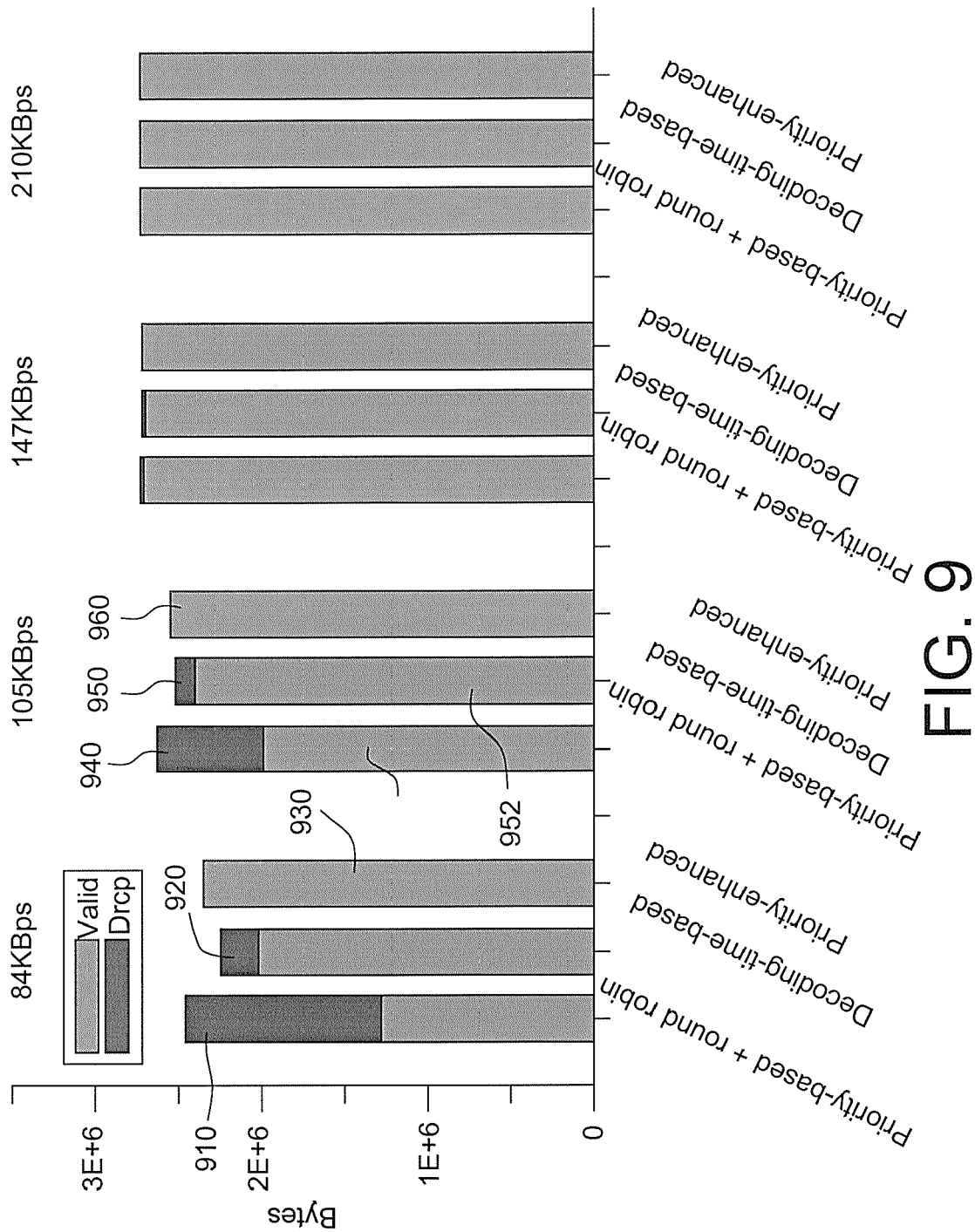
FIG. 9 is a schematic diagram of a comparison of an priority-enhanced scheduling method applied in the present embodiment, a traditional priority-based and round-robin scheduling method, and a decoding-time-based method.

Please refer to FIG. 9. The priority-enhanced scheduling method applied in the present embodiment, labeled as 930, has better transmitting results compare to that of the priority-enhanced and round-robin scheduling method (labeled as 910 in the figure), and the decoding-time-based scheduling method (labeled as 920 in the figure). The figure shows the data bytes occupied by the drop frames received by the BS and the data bytes occupied by the valid frames. It is clear that the present invention can transmit an increasing amount of valid data in the same bandwidth.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A mobile station, comprising:
    a first storage queue set, having a plurality of storage queues to receive a plurality of packets of various transmission types;
    a classifier, connected to the first storage queue set to receive the plurality of packets;
    a second storage queue set, having a plurality of storage queues and connected to the classifier, wherein the classifier classifies and stores the plurality of packets of the second storage queue set to the plurality of storage queues of the second storage queue set according to a characteristic value of the plurality of packets;
    a scheduler, connected to the second storage queue set, wherein the scheduler schedules the plurality of packets stored corresponding to an order of the plurality of storage queues of the second storage queue set with a s-list, wherein the scheduler sequentially schedules the plurality of packets for transmitting according to time points of the plurality of packets on the s-list, when another packet has been scheduled, the order of the s-list is switched to obtain a usable space so that the another packet is inserted according to a decoding time and a size thereof, and generates a tx-list and a drop-list according to a bandwidth grant; and
    a protocol data unit constructor (PDU constructor), accessing the plurality of packets of the plurality of storage queues of the first storage queue set corresponding to the tx-list and the drop-list, and transmitting the plurality of packets to a base station through an uplink.

2. The mobile station as claimed in claim 1, wherein the characteristic value of the plurality of packets referred by the classifier comprises types of packets and priorities of source queues.

3. The mobile station as claimed in claim 1, wherein the plurality of packets listed on the tx-list is sent within the bandwidth grant and the plurality of packets listed on the drop-list is not sent within the bandwidth grant.

4. The mobile station as claimed in claim 1, wherein the order of the plurality of storage queues of the second storage queue set to be inputted into the scheduler is scheduled according to an importance of the plurality of packets.

5. The mobile station as claimed in claim 1, wherein the first storage queue set and the protocol data unit constructor are disposed on a medium access control module of the mobile station.

6. The mobile station as claimed in claim 1, wherein the medium access control module further comprises a convergence sublayer, used to provide the plurality of packets of various transmission types of the first storage queue set.

7. The mobile station as claimed in claim 1, further comprising a physical layer, used to transmit the plurality of packets outputted by the protocol data unit constructor to the base station in sequence.

8. The mobile station as claimed in claim 1, wherein the bandwidth grant is a bandwidth assigned by the base station.

9. The mobile station as claimed in claim 8, wherein the bandwidth grant has a bandwidth size granted by the base station based on an IEEE802.16e standard.

10. A scheduling apparatus suitable for a mobile station, wherein the mobile station comprises a first storage queue set and a protocol data unit constructor, the first storage queue set has a plurality of storage queues used to receive a plurality of packets of various transmission types, and the protocol data unit constructor is used to transmit the plurality of packets to a base station through an uplink, and the scheduling apparatus comprising:
a classifier, connected to the first storage queue set to receive the plurality of packets;
a second storage queue set, having a plurality of storage queues, and connected to the classifier, wherein the classifier classifies and stores the plurality of packets of the second storage queue set to the plurality of storage queues of the second storage queue set according to a characteristic value of the plurality of packets; and
a scheduler, connected to the second storage queue set, wherein the scheduler schedules the plurality of packets stored corresponding to an order of the plurality of storage queues of the second storage queue set with a s-list, wherein the scheduler sequentially schedules the plurality of packets for transmitting according to time points of the plurality of packets on the s-list, when another packet has been scheduled, the order of the s-list is switched to obtain a usable space to insert the another packet based on a decoding time and a size of the another packet, generates a tx-list and a drop-list based on a bandwidth grant, and transmits the tx-list and the drop-list to the protocol data unit constructor such that
the protocol data unit constructor accesses the plurality of packets of the plurality of storage queues in the first storage queue set according to the tx-list and the drop-list and transmits the plurality of packets to a base station through an uplink.

11. The scheduling apparatus as claimed in claim 10, wherein the characteristic value of the plurality of packets referred by the classifier comprises priorities, decoding times, and sizes of the packets.

12. The scheduling apparatus as claimed in claim 10, wherein the plurality of packets listed on the tx-list is sent within the bandwidth grant and the plurality of packets listed on the drop-list is not sent within the bandwidth grant.

13. The scheduling apparatus as claimed in claim 10, wherein the order of the plurality of storage queues of the second storage queue set to be inputted into the scheduler is based on an importance of the plurality of packets.

14. The scheduling apparatus as claimed in claim 10, wherein the bandwidth grant is a bandwidth assigned by the base station.

15. The scheduling apparatus as claimed in claim 14, wherein the bandwidth grant has a bandwidth size granted by the base station based on an IEEE802.16e standard.

16. A method for real-time traffic scheduling suitable for a mobile station, comprising:
storing a plurality of packets of various transmission types temporarily;
receiving a corresponding bandwidth grant through an uplink;
scheduling the plurality of packets into corresponding connections according to a characteristic value thereof;
scheduling the plurality of packets of the plurality of corresponding connections according to an order of the plurality of connections to temporarily store the plurality of scheduling results with an s-list, wherein the scheduler sequentially schedules the plurality of packets to be sent according to time points of the plurality of packets on the s-list, when another packet has been scheduled, the order of the s-list is switched to obtain a usable space to insert the another packet according to a decoding time and a size of the another packet, and generating a tx-list and a drop-list according to the bandwidth grant;
transmitting the plurality of packets corresponding to the tx-list and the drop-list through the uplink.

17. The method as claimed in claim 16, wherein the characteristic value includes priorities, decoding times, and size of the packets.

18. The method as claimed in claim 17, wherein the switching of the s-list to obtain the usable space is performed when an idling period obtained from the switching is determined to be greater than a duration δ of the packet.

19. The method as claimed in claim 18, wherein the idling period is sufficient for the packet to be scheduled, then a time point of the decoding time $t_d$ of the packet is checked to see whether the packets of higher priorities have been scheduled in the s-list or the time point is a usable idling period such that the packet can be scheduled into the s-list.

20. The method as claimed in claim 16, wherein the plurality of packets listed on the tx-list is sent within the bandwidth grant and the plurality of packets listed on the drop-list is not sent within the bandwidth grant.

21. The method as claimed in claim 16, wherein the scheduling of the plurality of packets into the corresponding connections is based on an importance of the plurality of packets, which is based on a characteristic value of the plurality of packets.

22. The method as claimed in claim 16, wherein the first storage queue set and the protocol data unit constructor are disposed on a medium access control module of the mobile station.

23. The method as claimed in claim 16, wherein the bandwidth grant is a bandwidth assigned by the base station.

24. The method as claimed in claim 23, wherein the bandwidth grant has a bandwidth size granted by the base station based on an IEEE802.16e standard.

* * * * *